United States Patent [19]

Batterham et al.

[11] Patent Number: 5,201,940
[45] Date of Patent: Apr. 13, 1993

[54] PRE-HEATING AND PRE-REDUCTION OF A METAL OXIDE

[75] Inventors: Robin J. Batterham, Sandringham; Roderick M. Grant, Doncaster; James V. Happ, Ringwood, all of Australia; Glenn A. Thiele, Williams Lake, Canada

[73] Assignee: CRA Services Limited, Melbourne, Australia

[21] Appl. No.: 768,431

[22] PCT Filed: May 30, 1990

[86] PCT No.: PCT/AU90/00232

§ 371 Date: Sep. 26, 1991

§ 102(e) Date: Sep. 26, 1991

[87] PCT Pub. No.: WO90/15162

PCT Pub. Date: Dec. 13, 1990

[30] Foreign Application Priority Data

Jun. 2, 1989 [AU] Australia ............................. PJ 4545

[51] Int. Cl.[5] .............................................. C22B 34/32
[52] U.S. Cl. ........................................ 75/414; 75/443; 75/623; 75/707
[58] Field of Search .................. 266/182; 75/443, 623, 75/707, 452, 453, 454, 455, 456, 457, 444, 445, 446, 414

[56] References Cited

U.S. PATENT DOCUMENTS 3,910,769 10/1975 Mayer et al. .
4,072,504 2/1978 Perdahl et al. ...................... 266/182
4,207,093 6/1980 Pastorino et al. ..................... 75/454
4,220,469 9/1980 Tippmer .............................. 75/707
4,317,677 3/1982 Weber et al. .
4,428,772 1/1984 Dominguez-Ahedo et al. .
4,434,001 2/1984 Edström et al. .
4,975,116 12/1990 Basen et al. ......................... 75/452
5,050,848 9/1991 Hardie et al. ....................... 266/182

FOREIGN PATENT DOCUMENTS 141018 5/1951 Australia .
A33224/89 10/1989 Australia .

Primary Examiner—Melvyn J. Andrews
Attorney, Agent, or Firm—Larson and Taylor

[57] ABSTRACT

The specification discloses a process for pre-heating and pre-reducing metal oxide ores. The process comprises introducing particles of an oxide ore entrained in a gas through a port into a treatment chamber. Inside the treatment chamber teh stream of entrained particles combines with a stream of high temperature reducing gas in such a way that the particles are heated rapidly and enter into flow patterns whereby contact with other particles and the internal surface of the treatment chamber is minimized. The stream of entrained particles and the stream of high temperature reducing gas are substantially co-current. A treatment chamber elongated in the direction of co-current flow is described in the specification. The hot off-gases may be derived from a molten bath reactor and comprise a high concentration of carbon monoxide and hydrogen.

11 Claims, 3 Drawing Sheets

PRE-HEATING AND PRE-REDUCTION OF A METAL OXIDE

FIELD OF INVENTION

The present invention relates to a process for pre-heating and pre-reducing a metal oxide.

BACKGROUND OF THE INVENTION

Off-gases from smelt-reduction furnaces are of high temperature and may contain significant quantities of reducing gases such as carbon monoxide and hydrogen. It would clearly be of economic advantage to recover at least some of the sensible heat and make use of some of the reducing potential of the gases.

A number of prior art processes are known which provide either pre-heating or pre-reduction of metal oxide ores. Two processes, one by the Kawasaki Steel company and the other by the Nippon Kokan company, combine both features.

Generally speaking, the known processes entail one or other of the following disadvantages, and sometimes more than one:

several treatment steps may be required;

expensive coke or other reductants may be required; or there may be temperature limitations leading to low pre-reduction, high residence time or low pre-heat temperature achieved.

If the temperature to which the oxide ore is exposed is too high, the particles may soften, leading to accretion on the apparatus and/or agglomeration of particles.

In the case of chromite ore, the pre-heating and/or pre-reduction processes described in the prior art are generally speaking limited to temperatures of around 1200° C., at which temperature reduction is very slow.

The specification of U.S. Pat. No. 4,566,904 discloses a process for using exhaust gases from a melting crucible to pre-reduce iron ore. The exhaust gases are first reduced and cooled with a reductant such as natural gas. The cooled reducing gas is then used to pre-reduce the iron ore in a shaft furnace, a circulating fluidized layer or a fluidized bed. The optimum temperature of the cooled reducing gas if 900° C. which is considerably less than the temperature of the exhaust gas. Consequently this process involves a considerable loss of sensible heat which is used to increase the concentration of reductants in the exhaust gas.

The specification of U.S. Pat. No. 4,629,506 describes the production of ferrochromium from a ferriforous chrome ore. The ore is heated in a rotary kiln for 20 minutes to 2 hours to a temperature in the range from 1480° C. to 1580° C. An atmosphere containing carbon monoxide is maintained inside the kiln to reduce the ore. The resultant plastic mass is cooled, crushed and magnetically separated into a coal rich fraction and a metal rich fraction. Preferably, the metal rich fraction is separated by dry density separation into a metal poor slag fraction and a metal rich alloy fraction, the slag rich fraction is crushed and a metal rich slag fraction is extracted by magnetic separation. The metal rich slag fraction is added to the metal rich fraction and both are then melted in a crucible for further processing.

The process described in U.S. Pat. No. 4,629,506 involves a number of process steps thereby resulting in additional capital and operating expenditure when compared with a process requiring less steps. Furthermore, the exhaust gases from the crucible are preferably used as carrier gases for blowing coal and ore into the crucible or for low temperature coking of the coal.

U.S. Pat. No. 4,851,040 describes a process for producing iron from fine grained iron ore by direct reduction. The process involves inserting sponge iron and coal fines or a low temperature carbonized coal into an iron bath and injecting oxygen to produce a reducing gas and iron. The reducing gas is used to reduce a pre-heated carbon coated fine grained iron ore in a "fluidized bed" at a temperature in the range from 700° C. to 1100° C. Spent reducing gas is used to preheat the fine grained ore to a temperature in the range from 450° C. to 700° C. as well as coat the grains of ore with fine grains of carbon. The fine grains of carbon are deposited on the grains of ore by decomposition of carbon monoxide. The carbon layer on the grains of ore prevents the grains from sticking during the reduction phase.

A process developed by Kawasaki Steel KK uses fine, unagglomerated ore; see JP 59080706. Pre-heating and pre-reduction is performed in a fluidized bed. Heat and carbon monoxide-rich reducing gas are supplied from the smelting reduction furnace off-gas and are supplemented by the injection of hydrocarbon gas. The pre-mixing of the furnace gas at 1350°–1400° C. with cooler hydrocarbon gas, for example, methane or propane, results in a cooler gas mixture such that the bed temperature is about 1200° C. It is believed that, at this temperature, a residence time of 12–15 hours is required for substantial reduction of South African chromite with a mean particle diameter of 325 $\mu$m. It is also believed that only limited reduction of the iron and chromium oxides was achieved when furnace gas, comprising carbon monoxide, was used alone. The hydrocarbon gas makes major contribution to the reduction of the chromite.

It is believed that the disadvantages of this process are the need for addition of hydrocarbon gas to achieve substantial reduction, and the low temperature of the fluidised bed, which causes the low rates of reaction but is necessary to prevent softening of the chromite feed and subsequent agglomeration of the particles within the fluidised bed. It seems that the consequent high residence time prevents all chromite ore feed from being pre-heated and pre-reduced. (Some chromite ore is injected directly to the smelting reduction furnace.

An object of the present invention is the provision of a process for partly or almost completely reducing fine to coarse-grained metallic oxides, in particular metal ores, whereby the metallic oxide particles do not agglomerate in any appreciable amount but exist after the prereduction in the form of a granular, pneumatically conveyable material, and these partly reduced particles can be supplied to a final reducing process, preferably a smelting reduction process, without requiring any further elaborate processing steps.

Accordingly the present invention provides a process for pre-heating and pre-reducing a metal oxide which process comprises forming a stream of metal oxide particles and hot reducing gas to heat and to reduce at least partially the metal oxide particles wherein the hot reducing gas has a temperature in excess of that at which the metal oxide particles, particles contained in the stream of reducing gas or both exhibit sticky characteristics.

Metal oxide particles exhibit sticky characteristics when heated to a temperature range in which one or more phases present in the oxide exist as liquids and the remaining phases continue to exist in the solid state. This normally occurs first at a eutectic or peritectic point in the multi-component system. When all the phases present exist in the liquid form, the metal oxide particles no longer exhibit sticky characteristics. The temperature at which metal oxide particles begin to exhibit sticky characteristics and the range of temperatures over which they exhibit sticky characteristics varies from one metal oxide to another and one mineral mixture to another. On the low side are systems such as $Al_2O_3$-$FeO$-$SiO_2$ and $FeO$-$Fe_2O_3$-$SiO_2$ where certain compositions are liquid at 1150° C. On the high side are systems such as $CaO$-$MgO$-$SiO_2$ in cases where the bulk of iron or other reducibles have been extracted from fluxes and gangue minerals. Such systems have melting points around 1300° to 1350° C. In general stickiness associated with metallization of iron can occur at temperatures down to 600° C. but is most rapid at temperatures in excess of 1000° C. This threshold is increased by 100°-200° C. when heating ores containing manganese or chromium.

The hot reducing gas may be a synthesis gas derived directly from the combustion of natural gas or coal in the presence of steam. Preferably, however, the hot reducing gas is an off-gas from a smelting reduction furnace. Such off-gases normally contain carbon monoxide and some hydrogen. In addition hot off-gas from a smelting reduction furnace frequently contains particles of metal oxide ore, particles of ore that have been partially reduced and droplets of metal. The outlet temperature of such off-gases normally exceeds the sticky temperature. Consequently, when off-gases are cooled, care must be taken to avoid agglomeration of the particles and accretion thereof on apparatus.

Agglomeration and accretion of sticky particles can be avoided by employing either or a combination of two techniques. The first technique involves rapidly heating the metal oxide particles to a temperature well in excess of the sticky temperature range and after a short interval rapidly cooling the particles to a temperature below the sticky temperature range. The second technique involves heating the metal oxide particles to a somewhat lower temperature which nevertheless involves heating some of the particles to a temperature in excess of the sticky temperature range and causing the particles to enter flow patterns such that inter-particle collisions of hot sticky particles and collisions of hot sticky particles with apparatus are minimized. This ensures that the metallic oxide particles can be maintained for a longer period within the sticky temperature range. This can be accomplished by first reducing the velocity of the stream as it flows from a first end of a vertical chamber towards a second end and subsequently increasing the velocity as the stream approaches the second end. In this way incoming particles are initially entrained or if present in the hot reducing gas remain entrained in the higher velocity entrance stream but as the stream slows as it moves towards the second end some of the particles diverge from the stream and fall back towards the first end. Whether or not a particle will remain entrained depends upon a number of factors including its density, size, surface area, surface roughness and its position in the stream. Particles remaining entrained in the stream cool below the sticky temperature range before reaching the outlet in the second end and particles which fall towards the first end also cool below the sticky temperature range before becoming entrained again in the higher velocity entrance stream of reducing gas.

This invention also provides a treatment chamber for pre-heating and pre-reducing metal oxides by the process according to the invention. The internal configuration of the chamber and the inlet ducts for reducing gas are chosen to promote pre-heating and pre-reduction while minimising agglomeration and accretion.

The treatment chamber comprises a body portion, a first end, a second end, an inlet in the first end and an outlet in the second end. The body and each end are defined by walls which taper from the body portion towards the inlet and the outlet respectively. The body portion has a cross-sectional area that is many times larger than that of the inlet and the outlet. Furthermore, the chamber is sufficiently elongated to ensure that the flow pattern hereinbefore described can be set up when the chamber is vertically oriented.

This invention further provides an apparatus for the smelting of a metal oxide ore, which incorporates the treatment chamber defined above.

A surprising advantage of the present invention is that it permits off-gases to be quenched while ensuring that any sticky solids or other entrained material are cooled to temperatures at which agglomeration and accretion is much reduced or prevented altogether. However, if the off-gases contain a relatively high proportion of sticky solids it may be necessary to alter certain variables of the process such as the rate of injection of fresh solid particles.

BRIEF DESCRIPTION OF THE DRAWINGS

In the accompanying drawings.

Off-gases from a molten bath reactor pass to a pre-heating and pre-reduction chamber. Fresh ore is also passed to this chamber and from there to a settling chamber and finally to the molten bath reactor.

Figure 2:
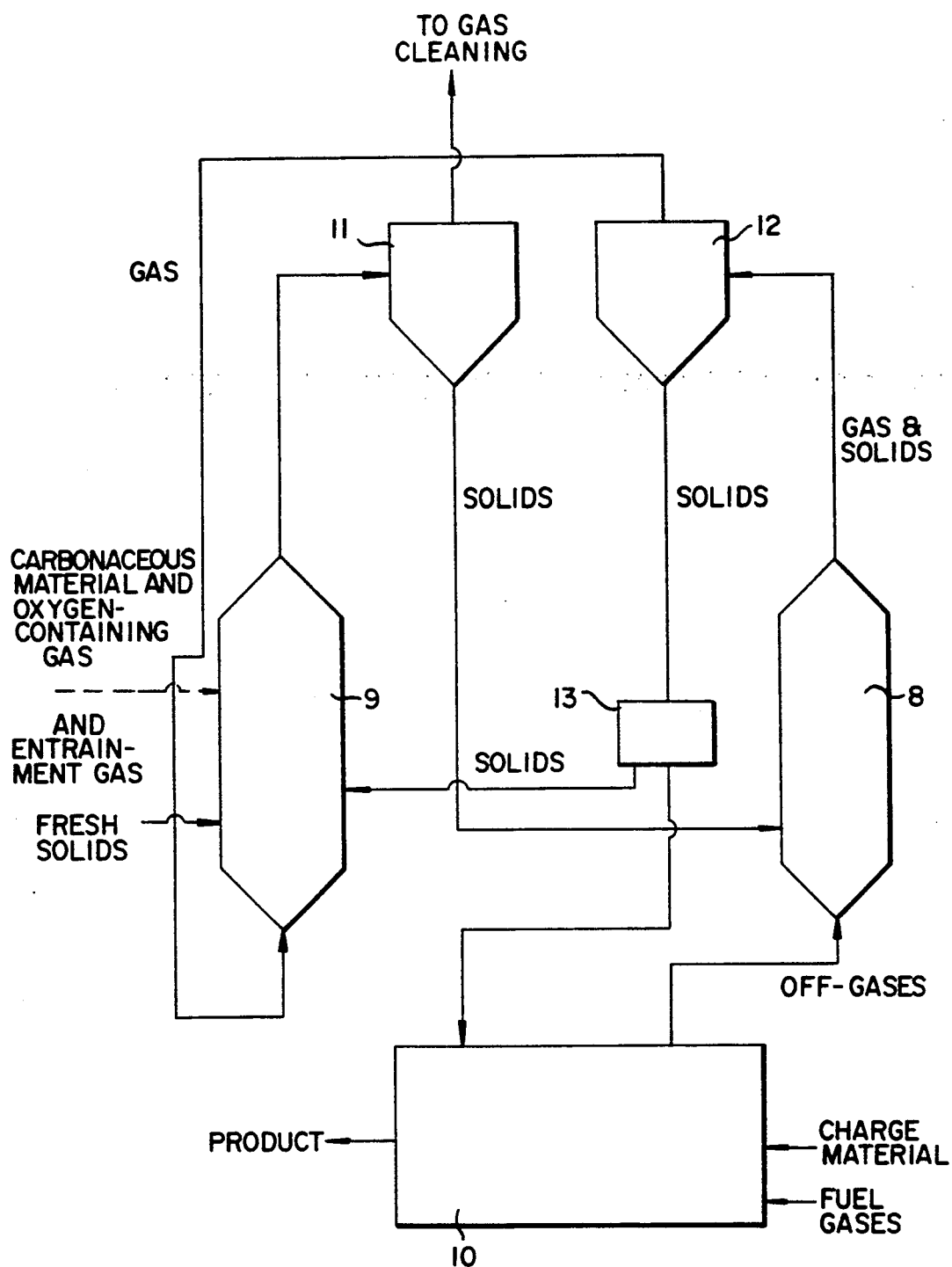

FIG. 2 illustrates another embodiment of the invention which features two pre-heating and pre-reduction chamber operating in series.

Figures 3A, 3B:
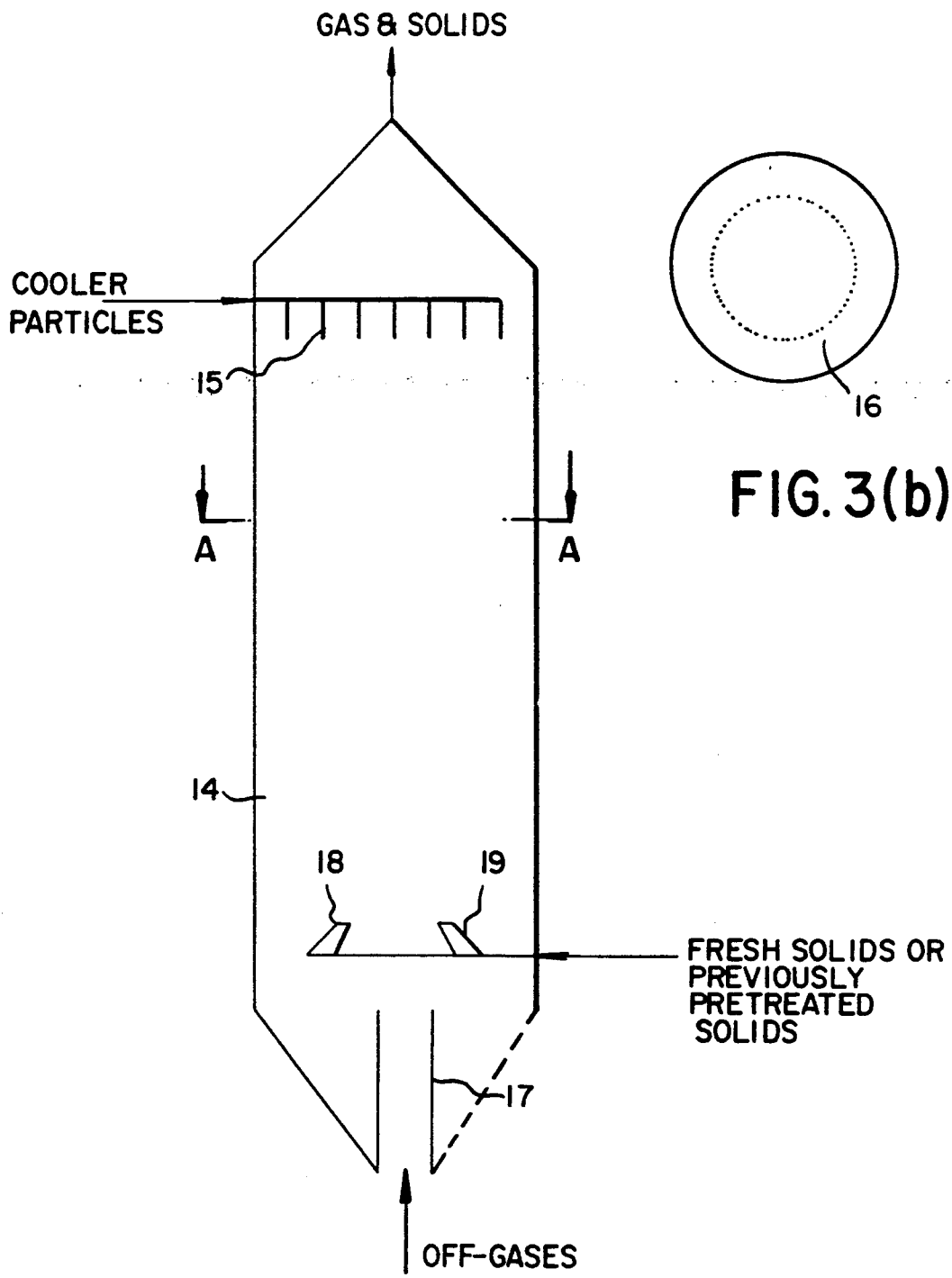

FIGS. 3(a) and 3(b) illustrate another embodiment of the treatment chamber according to invention.

DETAILED DESCRIPTION OF THE INVENTION

An embodiment of the invention will be described with particular reference to chromite ore but it can be applied to any other oxide ore. However, it has particular application to oxide ores which have a 'sticking point' at a temperature within or close to the temperature range at which relatively rapid reduction takes place. Certain oxide ores contain more than one metal. For example, chromite contains iron as well as chromium. Pre-reduction of either or both metals is an advantage. It is recognised that pre-reduction may not reduce all the oxides or oxide components.

The invention may be used in conjunction with any reactor which produces off-gases at elevated temperature with reducing potential. It is of particular use in conjunction with a molten bath reactor, for example, a molten ferroalloy bath reactor used to reduce chromite ore. Where off-gas is used, the process according to the invention performs the function of reaction and/or heating of the particulate material and the off-gases is itself quenched. Any sticky or molten substance entrained in the off-gas may adhere to the fine particles. In many cases the presence of a certain amount of this substance is quite acceptable.

The invention utilises some of the chemical energy and sensible heat, derived from a pyrometallurgical reactor, to pre-heat and pre-reduce metal oxide ores. In one embodiment these particles of metal oxide ore may be heated to a very high temperature to obtain enhanced rates of reduction of the metal oxides. Even if the temperatures employed are lower than those at which stickiness of particles is significant in a particularly preferred embodiment, the process according to the invention provides an improvement over the prior art by reducing contact of the particles in the stream of gas with each other and also with interior surfaces.

The particles are subsequently cooled rapidly below their sticking temperature.

Generally speaking hot off-gases from a suitable source are introduced through an inlet duct or ducts located close to one end of an elongated pre-heating and pre-reduction chamber. The duct or ducts are preferably also located axially or close to the axis of the chamber.

The cross-sectional area of the pre-heating and pre-reduction chamber should be substantially greater than the corresponding cross-sectional area of the ducts to minimise direct contact of the off-gases with the walls of the chamber.

The oxide particles should preferably be introduced into the chamber at a point or points in close proximity to the points of entry of the off-gases. The ore inlet or inlets should preferably be orientated substantially in alignment with the direction of bulk flow of the off gases and to some extend towards the axis of the chamber. A degree of swirl may also be provided to the gases transporting the oxide particles.

The oxide particles may originate from bulk storage or from another chamber operated in conjunction with the first-mentioned chamber. The oxide particles are transported to the chamber by any suitable gas including off-gas which has been completely oxidised.

The oxide particles are introduced into the off-gas stream in the treatment chamber in such a manner that they are entrained in the bulk flow of gas, minimising contact between particles and with interior surfaces. The fine metal oxide particles are heated rapidly to very high temperature through contact with the hot off-gases. It is surmised that certain flow patterns set up within the chamber near the wall of the chamber have a major role in the prevention of accretion and agglomeration. Heat is lost through the wall of the chamber. At the stage of discharge from the chamber, the particles in the flow patterns have dropped in temperature below the sticking temperature.

Contact between hot oxide particles may be minimised by varying the relative proportions of hot gas and metal oxide. Usually the quantity of gas available is 'given' and is dependent upon the operation of the furnace, for example. Thus the feed rate of new metal oxide particles is matched to the flow of gas. This factor should also be taken into account in the design of the chamber, for example, to avoid unnecessary choke-points and to promote gas flow, which after entry into the chamber, should be substantially axial.

The chamber may be fitted with a riser and in this case, the particles will cool further before entering the means to conduct the particles to the next treatment stage.

As mentioned previously, the internal configuration of the chamber and the inlet ports is chosen to promote pre-heating and pre-reduction and to minimise agglomeration of particles and accretion on interior surfaces. The shape of the or each port or inlet duct is selected to provide smooth, rounded interior surfaces with the minimum of dead space to reduce or eliminate agglomeration of particles from the molten bath reactor around the port or duct.

Once the particles have been reduced to the desired temperature they may be withdrawn from the chamber and passed to further processing, for example, in a cyclone.

A suitable temperature gradient may be achieved by means of external cooling.

The residence time of the particles in the region of elevated temperature may be controlled by adjusting flow rates of one or both of the furnace off-gases and the carrier gas.

It should be noted that the oxide particles may be passed once through the chamber or more than once, as required.

In one embodiment of the invention a flux or fluxes may be added to either the fresh oxide feed or the recycled oxide feed, the flux or fluxes being entrained in the entrainment gas.

It may be advantageous to inject some carbonaceous material and oxygen-containing gas which, when conbusted, may be used to boost the temperature within the chamber to increase the rate of reduction.

Turning now to a more detailed consideration of the use of off-gases from, for example, a molten bath reactor, which contain a relatively high concentration of carbon monoxide and hydrogen, the exit temperature of these gases may range from 1400° to 1800° C.

Figure 1:
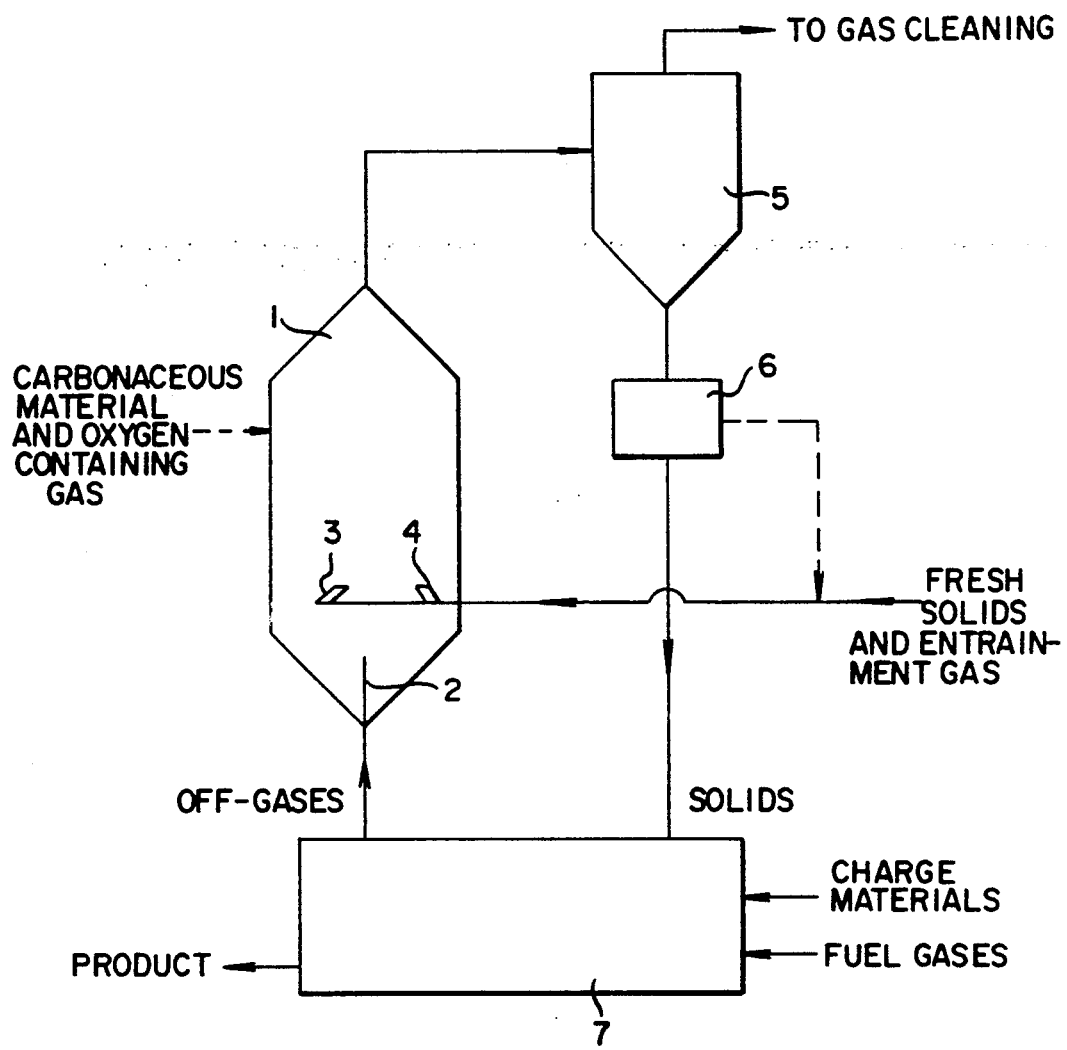
FIG. 1 illustrates one embodiment of the invention.

These off-gases are passed to a treatment chamber 1 as shown in FIG. 1, where they enter the chamber from inlet duct 2. Duct 2 is shown located upstream from ports 3 and 4 through which pass fresh ore in a carrier gas. (Location upstream is the usual location.) The spatial relationship of duct 2 to ports 3 and 4 and the internal dimensions of 1 are chosen to promote rapid reduction of the ore particles in the general region near ports 3 and 4, followed by cooling as they penetrate further into the chamber. In this way melting of the particles is minimised and stickiness reduced. The geometry of duct 2 and ports 3 and 4 and their spatial relationship are chosen to reduce contact of the particles with the wall of the chamber, reducing or preventing build-up on the wall.

As the stream of off-gases travels through the chamber, its velocity decreases since the cross-sectional area of the chamber is many times greater than that of the inlet duct 2. However, as the off-gases approach the outlet, the velocity of the stream progressively increases due to the progressive reduction in cross-sectional area of the chamber near its outlet. As a result of these velocity variations, flow patterns can be established which reduce the propensity of the particles to agglomerate or to accrete to apparatus.

Gas and entrained solids pass to separator 5 from which waste gas passes to gas cleaning. Solids from 5, still entrained in gas, pass to stream divider 6. All of the solids may be passed to a molten bath reactor 7 or a proportion may be returned to treatment chamber 1.

Turning now to FIG. 2, two treatment chambers 8 and 9 are provided in series. Off-gases from molten bath reactor 10 pass to chamber 8 where they combine with entrained solids originating from separator, chamber 9 and ultimately from a fresh feed source (not shown). Gas and solids from chamber 8 are passed to separator 12, the separated gas being passed to chamber 9 and the solids to splitter 13. The solids from splitter 13 are divided, one portion being passed to reactor 10 and the other portion to chamber 9. Ducts and ports in chambers 8 and 9 are similar to those in chamber 1 in the embodiment shown in FIG. 1.

In the embodiment shown in FIG. 2, the fresh solids are injected into the cooler treatment chamber 9, before being passed via separator 11 to hotter chamber 8.

In both of the embodiments shown in FIGS. 1 and 2, the solids which are passed to the respective molten bath reactor are conveniently admitted through the top of the reactor but may be injected at other points in the reactor. At the top of the reactor the entry port may be separate or combined with the entry port for oxygen-containing gas, for example, through an annulus surrounding the entry port for oxygen-containing gas.

In the embodiment of FIGS. 3(a) and (b), cooler particulate material is introduced into chamber 14 near the chamber exit but in proximity to the chamber walls, so as to provide a falling curtain of cooler particles adjacent to the interior surface. These particles, as they fall towards the off-gas entry duct of the chamber become entrained in the flow of off-gas, and leave the chamber through the gas and solids exit duct. The particles enter chamber 14 through internal, annular distributor 15. The falling curtain is designated 16 in FIG. 3(b), which represents a cross-sectional view along line A—A of FIG. 3(a). Duct 17 and ports 18 and 19 are similar to those shown in FIG. 1.

Generally speaking, hot solids, which have a tendency to agglomerate during prior processing, are not readily amenable to introduction into molten baths via tuyeres or injectors. In consequence of their fine particle size, the pre-heated solids produced according to this invention are well-suited to conveying and injecting into a molten bath process.

In both of the embodiments shown in FIGS. 1 and 2, the dotted arrow to the left of the figure indicates injection of carbonaceous material and oxygen-containing gas. However, the region of injection must be carefully selected so as not to interfere with the mechanism of rapid heating of the particles following by cooling. The rate of reduction may also be boosted by injection of, for example, carbon monoxide, through duct 2.

In the specification the term 'oxygen-containing gas' refers to pure oxygen and gas containing oxygen, including air and oxygen-enriched air.

In the specification the term 'carbonaceous material' refers to any carbon-based material which can be burned to produce a suitably high temperature and includes: anthracite, bituminous or sub-bituminous coal, coking or steaming coal, coke, lignite or brown coal, lignite or brown coal derived char, heavy petroleum residues and natural gas. The lignite or brown coal may have been densified using the process disclosed in Australian patents Nos. 561584 and 588565 and lapsed application No. 52422/86. A process for preparing a char from such a densified product is disclosed in Australian patent application No. 52234/86.

In the specification the molten bath reactor from which the hot off-gases are supplied may, for example, be any of the following: molten iron bath reactor, deep slag process reactor, ferroalloy bath reactor, non-ferrous bath reactor, or any other pyrometallurgical process bath reactor that discharges hot off-gases.

The method can be combined with any reduction or melt-down processes in which the prereduced ores are completely reduced. These may be either known smelting reduction units or, for example, shaft furnaces, rotary kilns, fluidization or circulating fluidization.

A particularly advantageous application of the method, however, is to operate it together with a smelting reduction vessel. The waste gas released from the smelting reduction reactor can be used directly in the pre-reduction chamber for reducing granular metal ores, and the resulting pre-reduced material completely reduced thereafter in the smelting reduction vessel. This combined process offers a number of benefits. The impurities in the waste gas from this smelting reduction vessel whether dust, sticky particles or fine metal droplets, are acceptable in the reaction vessel and settle for the most part on the ore particles. The high temperature of the waste gases from the smelting reduction vessel provides the thermal energy necessary for heating the granular metal ores, and the ore is pre-reduced by the high CO and $H_2$ present in the waste gas. This involves a cooling effect, and the granular metal ores additionally cool the waste gas to a desired, controllable degree. The stated features of the process allow, all in all, for a selective control of the degree of reduction of the ores, the temperature and the flow conditions in the reaction vessel.

We claim:

1. A process for pre-heating and pre-reducing a metal oxide comprising the step of introducing metal oxide particles into a stream of hot reducing gas to heat to reduce, at least partially, the metal oxide particles wherein the hot reducing gas has a temperature in excess of that at which the metal oxide particles, or the metal oxide particles while contained in the stream of reducing gas exhibit sticky characteristics.

2. A process according to claim 1 further comprising the steps of:

heating oxide particles to a temperature in excess of that at which they exhibit sticky characteristics and thereafter quenching said metal oxide particles to a temperature below that at which they exhibit sticky characteristics.

3. A process according to claim 1 further comprising the steps of:

forming the stream in a chamber and causing the metal oxide particles introduced in the stream to enter desired flow patterns in which interparticle contact is minimized and sticky particles are cooled below their sticky temperature before contacting internal walls of the chamber.

4. A process according to claim 3 further comprising the step of entraining the metal oxide particles in a gas to form a stream of entrained metal oxide particles to mix with said stream of hot reducing gas to form a stream of metal oxide particles and hot reducing gas.

5. A process according to claim 3 further comprising the steps of:

progressively reducing the velocity of the stream of metal oxide particles and not reducing gas as the stream travels through the chamber from a first end towards a second end of the chamber and then causing the velocity to increase as the second end is approached, whereby said metal oxide particles are caused to enter the desired flow patterns.

6. A process according to claim 1, wherein the hot reducing gas is an off-gas from a smelting reduction furnace.

7. A process according to claim 6, wherein the temperature of the off-gas is in the range from 1400° C. to 1800° C.

8. A process according to claim 1, wherein the metal oxide particles are comprised of a chromite ore.

9. A process according to claim 4, wherein a degree of swirl is imparted to the stream of metal oxide particles and hot reducing gas by the stream of entrained metal oxide particles.

10. A process according to claim 1, wherein a portion of the metal oxide particles comprise recycled particles of metal oxide.

11. A process according to claim 4 further comprising the steps of:

progressively reducing the velocity of the stream of metal oxide particles and not reducing gas as the stream travels through the chamber from a first end towards a second end of the chamber and then causing the velocity to increase as the second end is approached, whereby said particles are caused to enter the desired flow patterns.

* * * * *